Patented Dec. 17, 1946

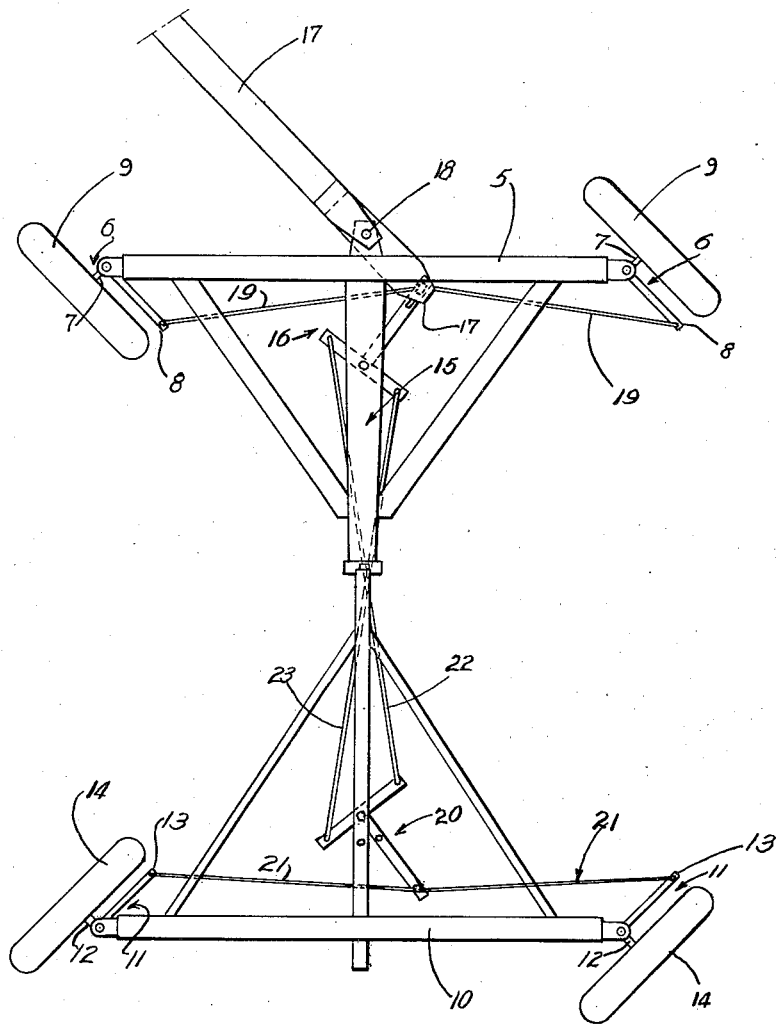

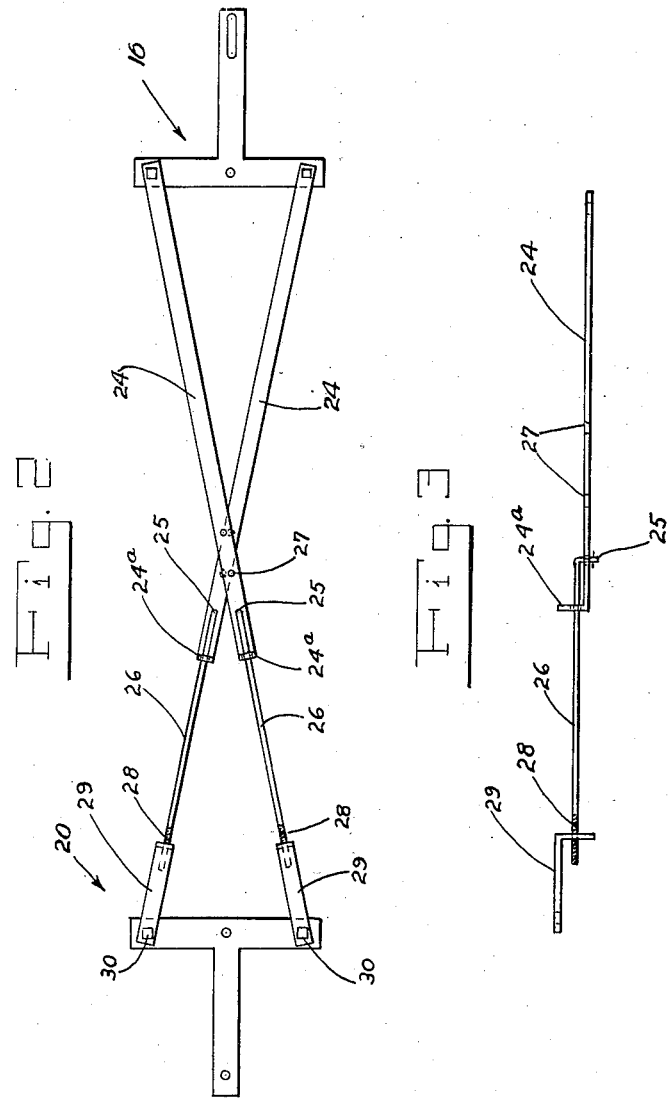

2,412,927

UNITED STATES PATENT OFFICE 2,412,927

WHEEL STEERING MEANS FOR WAGONS AND THE LIKE

Richard N. Thorn, West Concord, Minn.

Application January 8, 1945, Serial No. 571,883

3 Claims. (Cl. 280—33.55)

1

This invention relates to structural means expressly adapted for incorporation in a multiple wheel supported frame structure such as is employed in the construction of farm wagons and equivalent vehicles, the means being such as to cause the rear wheels to track in unison with the front wheels.

It is common practice these days to hook a number of four-wheeled farm wagons of the so-called turnable wheel types behind a tractor to accomplish easy and prompt results in the performance of certain farm chores. On farms where buildings are often close together, or close to fences, it is often difficult to utilize wagons having steerable front wheels and rigid rear wheels. This is due to the large clearance arc which is required in turning a string of vehicles to follow the tractors. On highways and roads it is necessary for the tractor to virtually cross over on the wrong side of the center line, that is, with regular wagon constructions, in order to keep the wagons on the road and to make the turn properly. It follows, therefore, that the purpose of the present invention is to provide a farm wagon in which both front and rear wheels are mounted on axle supported steering knuckles and properly steerable, the rear wheels taking an angle of divergence opposite to that of the front wheels in order to track along with the front wheels.

In carrying out the principles of the invention, I achieve the desired aim through the use of a tongue which is pivotally mounted on the forward end of a reach pole of the frame, the latter embodying front and rear axles, the latter having steerable pairs of wheels, and an operating connection being provided between the swinging tongue and sets or pairs of wheels in order to bring about the desired simultaneous and proper operation of all wheels.

More specifically, novelty is predicated upon the use of proper tie connections between the front and rear wheel spindles, there being an operating connection between the respective tie beams, which include pivoted T-shaped actuators, the latter being under the influence and control of the swingably mounted hitching and hauling tongue.

Other features and advantages of the invention will become more readily apparent from the following description and the accompanying illustrative drawings.

In the drawings, wherein like numerals are employed to designate like elements and parts throughout the views:

2

Figure 1 is a top plan view of the farm wagon running gear constructed in accordance with the principles of this invention and embodying the novel steering means.

Figure 2 is a top plan view of a modified form of the invention.

Figure 3 is an edge elevation of the structure seen in Figure 2.

Referring now to the drawings (Figure 1) by distinguishing reference numerals, it will be observed that the vehicle frame structure comprises a somewhat conventional front axle 5 that is provided with steering knuckles 6 mounted on the respective outer ends thereof. Each steering knuckle embodies a stub-axle 7 and a motion transmitting pitman or crank arm 8. Wheels 9 are operatively mounted on the respective stub axles 7. The rear part of the structure comprises a rear axle 10, steering knuckles 11 mounted on the respective outer ends of the rear axle with each steering knuckle, as before indicated, made up of a stub-axle 12 and a motion transmitting pitman or crank arm 13. In this instance the wheels 14 are likewise mounted on the stub-axles, that is, the last named stub axles 12. A reach pole is centrally and longitudinally arranged at right angles to and is connected at opposite end portions with the front and rear axles 5 and 10 respectively. A T-actuator 16 is pivotally mounted on the reach pole 15 and is located inwardly of the adjacent front axle 5. In addition, a tongue 17 is pivotally mounted, as at 18, on the forward or front end portion of the reach pole and has operating and connection with the adjacent T-actuator 17, there being operating connecting links of a rigid type 19 between said T-actuator 16 and the respective pitman arms 8. Attention comes now to a second T-actuator 20 which is pivotally mounted on the rear end portion of the reach pole and is located inwardly of the rear axle 10, there being operating connections or rigid links 21 between said last named T-actuator and the adjacent pitman or crank arms of the steering knuckles 11. Finally, I provide a pair of substantially rigid rods 22 and 23 and these are arranged in crossed relationship to provide an X-shaped operating connection between the heads on the respective T-actuators 16 and 20.

Considering the construction described and mode of operation of the parts it is obvious that the rear wheels 14 track in unison with the steerable front wheels 9.

In the form of the invention seen in Figure 1, an arrangement of simple one-piece rods 19 and 20 is employed as the connecting and motion transmitting linkage between the two T-actuators. In Figure 2 I show a modification which is constructed as follows:

Each connection between said T-actuators comprises a long strap, that is a metal strap 24, this having an upturned end 24a. This serves as a guide and retention element for the L-shaped end 25 of a connecting rod 26. The L-shaped end is selectively anchorable in the hole 27. The threaded end of the rod 28 is adjustably connected with an L-shaped bracket 29 which is bolted as at 30 to the cross-head on the adjacent T-shaped actuator 20. The actuators are indicated by the same reference numerals as employed in Figure 1, that is 16 and 20, respectively. The only difference is in the make-up of the connecting elements between the said T-actuators. The claims are to be interpreted accordingly.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. A vehicle frame structure of the class described including a front axle, a rear axle, a reach pole at right angles to and rigidly connected at opposite front and rear ends to central portions of said axles, steering knuckles mounted on the respective outer ends of said front and rear axles, each steering knuckle embodying a stub-axle and motion transmitting pitman arm, four ground engaging wheels, said wheels being individually mounted on the respective stub-axles provided therefor, a tongue pivotally mounted at its inner end on the forward end of said reach pole, front and rear T-actuators pivotally mounted on said reach pole at points inwardly of said axles, crossed rods connecting said T-actuators for simultaneous operation, forward and rear pairs of rigid push-pull links connecting the pitman arms of the front and rear steering knuckles with companion front and rear T-actuators, an operating connection between the pivoted end of said tongue and the adjacent front T-actuator.

2. A vehicle frame structure of the class described including a front axle, steering knuckles mounted on the respective outer ends of said front axle, each steering knuckle embodying a stub-axle and a motion transmitting pitman arm, wheels operatively mounted on the respective stub-axles, a rear axle, steering knuckles mounted on the respective outer ends of said rear axle, each steering knuckle embodying a stub axle and motion transmitting pitman arm, wheels mounted on the last named stub-axles, a reach-pole at right angles to and rigidly connected at opposite front and rear ends to central portions of said front and rear axles, a T-actuator pivotally mounted on said reach-pole inwardly of the front end of said pole and inwardly of said front axle, a tongue pivotally mounted on the front end of said reach-pole and having operating connection with said T-actuator, operating connections between said T-actuator and the respective pitman arms on said first named steering knuckles, a second T-actuator pivotally mounted on the rear end portion of said reach-pole inwardly of the rear axle, operating connections between said last named T-actuator and the adjacent pitman arms of the second named steering knuckles, and a pair of crossed connecting rods, said connecting rods operatively connecting the two T-actuators for simultaneous functioning.

3. As a component assemblage of a vehicle frame structure of the class described, a reach-pole adapted for connection at opposite ends with front and rear wheel supported axles, a T-actuator pivotally mounted on one end portion of said reach-pole, a second complemental T-shaped actuator pivotally mounted on the rear end portion of said reach-pole, a pair of crossed members operatively connecting the respective T-actuators for simultaneous actuation, a draft tongue, the inner end of said tongue being bifurcated, an adjacent end of said reach-pole projecting between and being connected with the furcations, and an operating connection between the bifurcated end of said tongue and the adjacent T-actuator.

RICHARD N. THORN.